US012759060B2

(12) United States Patent
Guerin

(10) Patent No.: US 12,759,060 B2
(45) Date of Patent: Oct. 13, 2026

(54) DRILLING TOOL

(71) Applicant: ADVANCED ELECTRICAL TOOLS, Seclin (FR)

(72) Inventor: Sylvain Guerin, Seclin (FR)

(73) Assignee: ADVANCED ELECTRICAL TOOLS, Seclin (FR)

( * ) Notice: Subject to any disclaimer, the term of this patent is extended or adjusted under 35 U.S.C. 154(b) by 985 days.

(21) Appl. No.: 17/619,814

(22) PCT Filed: Jun. 15, 2020

(86) PCT No.: PCT/FR2020/051024
§ 371 (c)(1),
(2) Date: Dec. 16, 2021

(87) PCT Pub. No.: WO2020/254750
PCT Pub. Date: Dec. 24, 2020

(65) Prior Publication Data

US 2022/0347767 A1 Nov. 3, 2022

(30) Foreign Application Priority Data

Jun. 17, 2019 (FR) ...................................... 1906452

(51) Int. Cl.
*B23B 49/02* (2006.01)

(52) U.S. Cl.
CPC ........ *B23B 49/023* (2013.01); *B23B 2215/04* (2013.01); *Y10T 408/56245* (2015.01)

(58) Field of Classification Search
CPC ....... Y10T 408/56245; Y10T 408/5623; Y10T 408/56238; Y10T 408/56253;
(Continued)

(56) References Cited

U.S. PATENT DOCUMENTS 2,839,953 A 6/1958 Hanger
5,161,923 A * 11/1992 Reccius .................. B23B 49/02 408/72 R
(Continued)

FOREIGN PATENT DOCUMENTS

DE 202008003538 U1 * 8/2008 ........... B23B 35/005
DE 20 2010 002 662 9/2010
(Continued)

OTHER PUBLICATIONS

International Search Report for PCT/FR2020/051024, mailed Oct. 22, 2020, 5 pages.
(Continued)

*Primary Examiner* — Ryan Rufo
(74) *Attorney, Agent, or Firm* — NIXON & VANDERHYE

(57) ABSTRACT

Disclosed is a drilling tool intended to cooperate with a tooling including at least one guide orifice, including: a hollow nose part, through which a drilling member is intended to pass; and a gripping clamp, slidingly mounted on the hollow nose part, the sliding of the gripping clamp rearward along the hollow nose part leading to its radial expansion towards the outside. The distal end of the gripping clamp includes a bead protruding radially towards the outside, configured to ensure the stopping in translation of the drilling tool with respect to the tooling, by bearing against a wall of the tooling surrounding the guide orifice, when the gripping clamp is expanded radially towards the outside.

8 Claims, 6 Drawing Sheets

(58) Field of Classification Search
CPC . Y10T 279/1008; B23B 49/02; B23B 49/023; B23B 31/2072; B23B 2270/34; B23B 2215/04; B23Q 3/069
See application file for complete search history.

(56) References Cited

U.S. PATENT DOCUMENTS

| | | | | |
|---|---|---|---|---|
| 5,395,187 | A * | 3/1995 | Slesinski | B23B 49/02<br>408/72 R |
| 8,225,508 | B2 * | 7/2012 | Houis | B23B 47/287<br>29/525.01 |
| 11,298,755 | B2 * | 4/2022 | Bos | B23B 49/023 |

FOREIGN PATENT DOCUMENTS

| | | |
|---|---|---|
| EP | 0 761 351 | 3/1997 |
| FR | 2 912 672 | 8/2008 |

OTHER PUBLICATIONS

Written Opinion of the ISA for PCT/FR2020/051024, mailed Oct. 22, 2020, 7 pages.

* cited by examiner

DRILLING TOOL

This application is the U.S. national phase of International Application No. PCT/FR2020/051024 filed 15 Jun. 2020, which designated the U.S. and claims priority to FR Patent Application No. 1906452 filed 17 Jun. 2019, the entire contents of each of which are hereby incorporated by reference.

TECHNICAL FIELD

The invention relates to a drilling tool, to a drilling assembly comprising such a drilling tool, as well as to a drilling method using such a drilling assembly, for the drilling of parts, and in particular of parts used in the aeronautical field.

PRIOR ART

A drilling tool cooperating with a tooling comprising at least one guide orifice, used in the aeronautical field, is known for example from the document EP 0 761 351 B1.

The drilling tool described in this document, as visible in the drawings of this document, comprises:

- a hollow nose part (labelled as 16) with a conical outer surface,
- a gripping clamp, with a conical inner surface, mounted on the conical outer surface of the hollow nose part, provided with an elastic front blocking part (labelled as 102), rigidly connected to a rear movement part (labelled as 104) and a movement mechanism, connected to the rear movement part, allowing to move the gripping clamp rearward along the hollow nose part, in such a way that the front blocking part is expanded in an elastic manner radially towards the outside, while coming in contact with the inner wall of a guide orifice of a tooling cooperating with said drilling tool, so as to ensure the stopping in translation of the hollow nose part with respect to said tooling, and thus the positioning of the drilling tool with respect to the tooling, and thus with respect to the surface of the part to be drilled, in order to carry out the desired drilling operation.

According to the observations of the inventor, such a drilling tool has several disadvantages.

First of all, with such a drilling tool, it is not possible to apply significant thrust on the part to be drilled, in that the stopping in translation of the drilling tool with respect to the tooling, and thus with respect to the part, is carried out via the friction between the elastic blocking part and the inner wall of the guide orifice of the tooling, and applying a stress that is too great onto the drilling tool can lead to the movement of the drilling tool with respect to the tooling (and thus with respect to the part to be drilled).

Likewise, once the gripping clamp is in its final position with respect to the hollow nose part ensuring the radial expansion of the elastic blocking part of the gripping clamp and allowing the stopping in translation of the drilling tool with respect to the tooling, it is no longer possible to vary the longitudinal position of the gripping clamp with respect to the hollow nose part, for example in order to compensate for a relative movement between the surface of the part to be drilled and the drilling tool during the drilling. It is thus not possible to compensate for the deformation of the surface of the part to be drilled engendered by the drilling stress (applied by the hollow nose part onto said surface of the part to be drilled or by the cutting tool, for example like a drill bit passing through the hollow nose part during the drilling), and so as to be able to vary the stress applied by the hollow nose part of the drilling tool onto the part to be drilled, which prevents being able to control the stress applied by the drilling tool onto the part to be drilled. Inversely, if the tooling is deformed (or moves) during the drilling, the relative movement between the surface to be drilled and the guide orifice of the tooling also cannot be compensated for.

Thus, for these reasons, the precision of the drilling carried out using such a drilling tool can find itself degraded because of this and not correspond to the shape and to the dimensions of the desired drilling.

Such a drilling tool including a body continued by a bearing mandrel, the end of which is intended to be in contact with the zone of overlap between two fuselage parts during a drilling operation, is also known from the document FR 2 912 672 A1.

During the drilling of an orifice in the fuselage, the drill bit is provided to move inside and concentrically with respect to the bearing mandrel. An expandable ring, intended to be introduced into a centring orifice of a drilling grid, conforms to the mandrel according to a conical contact surface. This conical contact surface, provided to shrink while moving closer to the end of the mandrel, allows during the applying of a relative movement according to a central axis of a conical contact surface, between the mandrel and the ring, an expansion of this ring ensuring its blocking in the corresponding centring orifice, and while bearing against the inner wall of the centring orifice.

This drilling tool is such that applying the relative movement between the expandable ring and the bearing mandrel is preferably carried out in such a way as to engender a movement of the mandrel bearing against the zone of overlap and through the corresponding centring orifice, and in such a way as to obtain a movement of the mandrel in the reference frame X, Y, Z of the aircraft, driving with it the part to which pressure is applied of the zone of overlap, the ring remaining substantially immobile in this same reference frame.

Nevertheless, this relative movement between the mandrel and the expansion ring with the latter remaining immobilised in the centring orifice can only be minuscule since this relative movement is only permitted by an elastic deformation of the drilling grid according to the radial direction of the centring orifice. The drilling grid must indeed necessarily have a significant rigidity in order to carry out its function, it can only deform elastically by a minuscule value.

This minuscule allowed travel between the mandrel and the expansion ring cannot allow to compensate for a movement between the mandrel and the zone of the part to be drilled or increase the stress exerted by the mandrel on said zone of overlap, during a drilling operation implemented with such a tool, which also does not allow to improve the precision of the drilling obtained.

The goal of the present invention is to overcome the disadvantages of the drilling tools of the prior art, by proposing a drilling tool used to carry out drillings in a part, in cooperation with a tooling comprising at least one orifice for guiding the drilling tool, improving the precision of the drillings carried out.

Another goal of the present invention is to propose such a drilling tool with a simple design and reduced production cost.

Other goals and advantages will appear during the following description which is only given for informational purposes and which does not have the goal of limiting it.

SUMMARY

A drilling tool is proposed intended to cooperate with a tooling comprising at least one guide orifice extending between a proximal wall and a distal wall of the tooling, intended to be located near a part to be drilled with the drilling tool, comprising:

a hollow nose part having an outer guide surface, through which a drilling member is intended to pass, a gripping clamp including an elastic front blocking part, with a distal end and a proximal end, slidingly mounted on the outer guide surface of the hollow nose part via an inner guide surface, said elastic front blocking part being rigidly connected to a rear movement part, a movement mechanism being connected to the rear movement part in order to move the gripping clamp rearward along the hollow nose part in such a way that the elastic front blocking part is expanded radially in an elastic manner towards the outside.

According to the invention, the distal end of the elastic front blocking part comprises a bead protruding radially towards the outside, configured to ensure the stopping in translation of the drilling tool with respect to the tooling, by bearing against the distal wall of the tooling surrounding said guide orifice.

According to the invention, the gripping clamp is configured to go:

from a retracted position, corresponding to at least one first relative position of the gripping clamp with respect to the hollow nose part, in which the gripping clamp is capable of being inserted and sliding along the guide orifice from a mouth of the guide orifice on the proximal wall, to a deployed position, starting from a certain travel of the gripping clamp towards the rear of the hollow nose part from said at least one first position of the gripping clamp with respect to the hollow nose part, in which the elastic front blocking part, including the bead protruding radially towards the outside, is expanded radially, with an arrangement of the bead such that the latter is capable of bearing against the distal wall of the tooling surrounding said guide orifice, preventing the sliding of the gripping clamp and of the drilling tool with respect to the guide orifice in the direction opposite to the drilling direction.

According to the invention, the outer guide surface of the hollow nose part is configured so as to cause the passage of the gripping clamp from its retracted position towards its deployed position, during the movement of the gripping clamp rearward along the hollow nose part on a first section of length of the outer guide surface of the hollow nose part, from the first position of the gripping clamp with respect to the hollow nose part, the outer guide surface of the hollow nose part comprising a second section of length, adjacent to the first section of length, configured to ensure the maintaining of the gripping clamp in the deployed position, without increasing the diameter of the elastic front blocking part by radial expansion, in such a way as to authorise the forward movement of the hollow nose part towards the surface of the part to be drilled to compensate for a relative movement between the guide orifice of the tooling and the surface of the part to be drilled during the drilling, as well as the deformation of the surface of the part to be drilled engendered by the drilling stress, and thus allow the control of the stress exerted by the hollow nose part on the surface of the part to be drilled.

According to optional features of the invention, taken alone or in combination:

the hollow nose part includes a distal end, configured to bear against the surface of the part to be drilled in order to exert the desired stress, the outer guide surface of the hollow nose part including:

a first guide portion extending from near said distal end of the hollow nose part, a second guide portion, to the rear of said first guide portion, forming the second section of length, a linking portion connecting the first guide portion to the second guide portion while flaring out, forming said first section of length, and the elastic front blocking part of the gripping clamp comprises a bead protruding radially towards the inside comprising said inner guide surface bearing against the outer guide surface of the hollow nose part, the outer guide surface of the hollow nose part being configured so that:

the retracted position of the gripping clamp corresponds to the position of the gripping clamp with respect to the hollow nose part in which the inner guide surface is in contact with the first guide portion of the outer guide surface of the hollow nose part, the passage from the retracted position to the deployed position of the gripping clamp corresponds to the position of the gripping clamp with respect to the hollow nose part in which the inner guide surface slides on the totality of the length of the linking portion, said inner guide surface cooperating with the second guide portion in such a way as to guarantee the maintaining in the deployed position of the gripping clamp, without increasing the diameter of the elastic front blocking part by radial expansion, in such a way as to authorise the forward movement of the hollow nose part towards the surface of the part to be drilled to compensate for a relative movement between the guide orifice of the tooling and the surface of the part to be drilled during the drilling, as well as the deformation of the surface of the part to be drilled engendered by the drilling stress, and thus allow the control of the stress of the hollow nose part on the surface of the part to be drilled, the first guide portion is substantially cylindrical, having a diameter D22, the second guide portion is substantially cylindrical having a diameter D23, strictly greater than D22, the linking portion is conical;

the inner guide surface of the elastic front blocking part includes a cylindrical wall, configured to bear against said first guide portion and against said second guide portion;

the inner guide surface includes a wall having a conical shape, to the rear of said cylindrical wall, having a conicity substantially equal to the conicity of the linking portion of the inner guide surface of the hollow nose part;

the movement mechanism includes two articulation parts each pivotably articulated onto said rear movement part according to two articulation axes positioned on either side of the longitudinal axis of the gripping clamp and which are the same, the two articulation axes of the first articulation part being parallel and symmetrical to the two articulation axes of the second articulation part with respect to said longitudinal axis of the gripping clamp, and each articulation axis is received in a bearing configured to slide in a housing having a corresponding shape made in the rear movement part, according to a direction perpendicular to the longitudinal axis of the gripping clamp and to the articulation axis received in said bearing, and each of said articulation parts is pivotably articulated with respect to a fixed plate according to a pivoting axis, perpendicular to said longitudinal axis of the gripping clamp, the pivoting axes of each of the articulation parts being disposed symmetrically to each other with respect to the longitudinal axis of the gripping clamp, and parallel to said articulation axes of the parts for articulation onto the rear movement part, the pivoting axis of an articulation part being farther from the longitudinal axis of the gripping clamp than its axes of articulation, and said articulation parts are connected to an actuator configured to drive the simultaneous and coordinated counter-rotational pivoting of each of the articulation parts with respect to the fixed plate about each of their pivoting axes, so as to drive the rotation of each of said articulation parts with respect to the rear movement part of the gripping clamp about their respective articulation axes and the sliding of each of the bearings in their housing, generating a sliding of the gripping clamp with respect to the hollow nose part along the longitudinal axis of the gripping clamp.

The invention also relates to a drilling assembly comprising:

- a drilling tool according to one of the embodiments of the invention;
- a tooling comprising at least one guide orifice extending between a proximal wall and a distal wall, intended to be located near a part to be drilled.

According to the invention, the guide orifice and the drilling tool are configured so that in said deployed position of the gripping clamp, the bead protruding radially towards the outside of the elastic front blocking part bears against the distal wall of the tooling surrounding said guide orifice, preventing the sliding of the gripping clamp and of the drilling tool with respect to the guide orifice in the direction opposite to the drilling direction.

According to one embodiment, the guide orifice has a substantially cylindrical shape having a length L11, having a diameter D11, such that the length L11 is strictly less than the length L31 of the elastic front blocking part, and the diameter D11 is strictly less than the diameter D33 of the bead protruding radially towards the outside of the elastic front blocking part, when the gripping clamp is in the deployed position.

According to one embodiment, the elastic front blocking part of the gripping clamp of the drilling tool has an outer guide surface extending to the rear of the bead protruding radially towards the outside, the diameter of which is between a minimum value D37min, in said retracted position, and a maximum value D37max, in said deployed position, such that the maximum value D37max of the diameter of the outer guide surface is strictly less than the diameter D11 of the guide orifice.

The invention also relates to a method for drilling a part implementing a drilling assembly according to one of the embodiments of the invention, with a drilling tool according to one of the embodiments of the invention, comprising the following steps:

- inserting the gripping clamp of the drilling tool, in its retracted position, into the guide orifice of the tooling, from its mouth on the proximal wall of the tooling, until the bead protruding radially towards the outside of the elastic front blocking part entirely exits the guide orifice at its mouth on the distal wall of the tooling,
- moving the gripping clamp rearward along the hollow nose part on the first section of length of the outer guide surface of the hollow nose part, until the deployed position of the gripping clamp, generating the stopping of the sliding of the drilling tool with respect to the guide orifice in the direction opposite to the drilling direction, the bead protruding radially towards the outside of the elastic front blocking part bearing on the distal wall of the tooling,
- applying of a controlled stress by the hollow nose part onto the surface of the part to be drilled, by movement of the gripping clamp by an adjustment travel on the second section of length of the outer guide surface of the hollow nose part, without increasing the diameter of the elastic front blocking part to compensate for a relative movement between the guide orifice of the tooling and the surface of the part to be drilled during the drilling, as well as the deformation of the surface of the part to be drilled engendered by the drilling stress.

BRIEF DESCRIPTION OF THE DRAWINGS

Other features, details and advantages will appear upon reading the following detailed description and analysing the appended drawings, in which.

DESCRIPTION OF EMBODIMENTS

The drawings and description below contain, in essence, elements of a certain nature. They can therefore not only be used to better explain the present disclosure, but also contribute to its definition, if necessary.

Figure 3A:
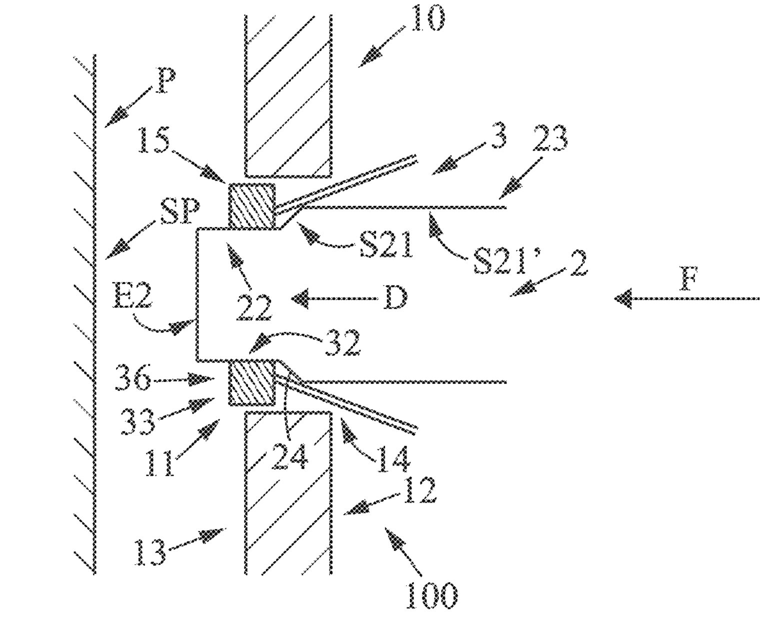
FIG. 3*a* shows a schematic cross-sectional view of a drilling assembly and of a part to be drilled according to an embodiment according to the invention, the drilling tool being in a first position with respect to the tooling, the gripping clamp being in the retracted position.
Figure 3B:
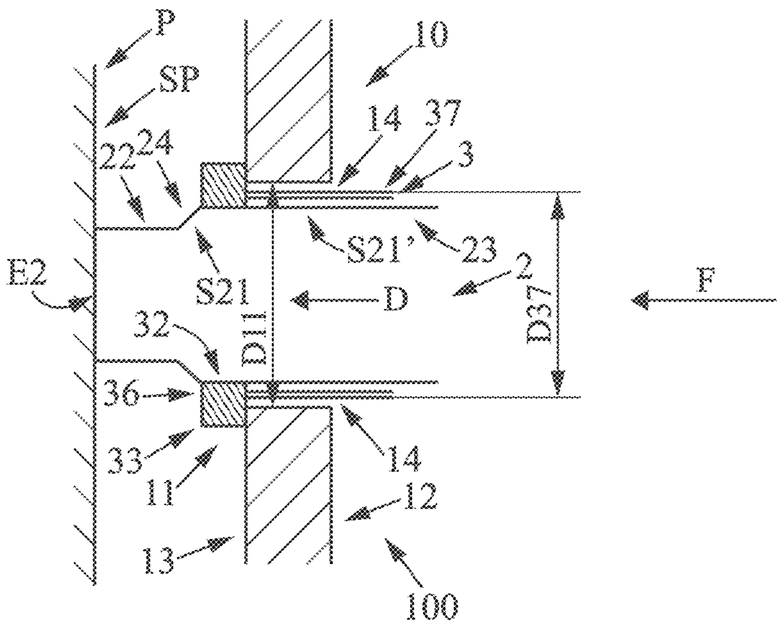
FIG. 3*b* shows a schematic cross-sectional view of a drilling assembly and of a part to be drilled according to an embodiment according to the invention, the drilling tool being in a second position with respect to the tooling, the gripping clamp being in the deployed position.
Figure 3C:
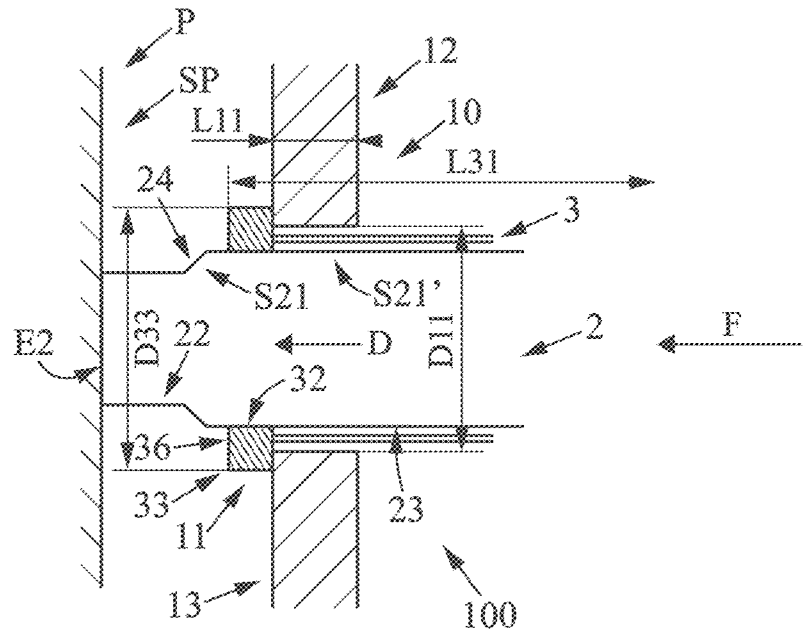
FIG. 3*c* shows a schematic cross-sectional view of a drilling assembly and of a part to be drilled according to an embodiment according to the invention, the drilling tool being in said second position with respect to the tooling, the gripping clamp being in the deployed position, and the elastic front blocking part being offset towards the rear of the gripping clamp, with respect to its position in FIG. 3*b*.
Figure 4:
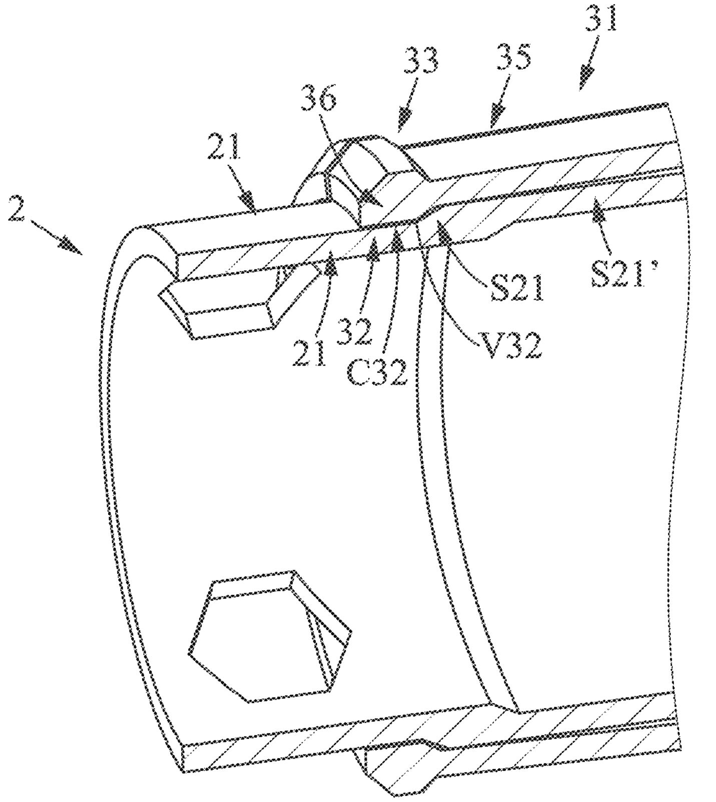
FIG. 4 shows a perspective cross-sectional view, according to the line II-II of FIG. 1, of the detail of the drilling tool of FIG. 1, at the distal end of the hollow nose part.

As visible in the embodiments of FIGS. 3*a* to 3*c*, the drilling direction D corresponds to the direction of movement of the drilling member (not shown) during a drilling operation carried out in the part P using the drilling tool 1 according to the invention.

Throughout the present application, the longitudinal direction of the elements of the drilling tool 1 corresponds substantially to the direction of the largest dimension of these elements, and is substantially parallel to said drilling direction D. The longitudinal axis A3 of the gripping clamp 3 (which is the same as the longitudinal axis A2 of the hollow nose part 2) is for example shown in FIGS. 5 and 6.

Likewise, the radial direction corresponds to a direction perpendicular to said longitudinal direction passing through the centre of the parts of revolution of the drilling tool 1, and in particular the hollow nose part 2 or the elastic front blocking part 31 of the gripping clamp 3.

The invention relates to a drilling tool 1 intended to cooperate with a tooling 10 comprising at least one guide orifice 11 extending between a proximal wall 12 and a distal wall 13 of the tooling 10, intended to be located near a part P to be drilled with the drilling tool 1, comprising:

- a hollow nose part 2 having an outer guide surface 21, through which a drilling member is intended to pass,
- a gripping clamp 3 including an elastic front blocking part 31, with a distal end E31 and a proximal end E31', slidingly mounted on the outer guide surface 21 of the hollow nose part 2 via an inner guide surface 32, said elastic front blocking part 31 being rigidly connected to a rear movement part 38, a movement mechanism 4 being connected to the rear movement part 38 in order to move the gripping clamp 3 rearward along the hollow nose part 2 in such a way that the elastic front blocking part 31 is expanded radially in an elastic manner towards the outside.

According to the invention, the distal end E31 of the elastic front blocking part 31 comprises a bead 33 protruding radially towards the outside, configured to ensure the stopping in translation of the drilling tool 1 with respect to the tooling 10, by bearing against the distal wall 13 of the tooling 10 surrounding said guide orifice 11.

According to the invention, the gripping clamp 3 is configured to go:

- from a retracted position, corresponding to at least one first relative position of the gripping clamp 3 with respect to the hollow nose part 2, in which the gripping clamp 3 is capable of being inserted and sliding along the guide orifice 11 from a mouth 14 of the guide orifice on the proximal wall 12, to
- a deployed position, starting from a certain travel of the gripping clamp 3 towards the rear of the hollow nose part 2 from said at least one first position of the gripping clamp 3 with respect to the hollow nose part 2, in which the elastic front blocking part 31, including the bead 33 protruding radially towards the outside, is expanded radially, with an arrangement of the bead 33 such that the latter is capable of bearing against the distal wall 13 of the tooling 10 surrounding said guide orifice 11, preventing the sliding of the gripping clamp 3 and of the drilling tool 1 with respect to the guide orifice 11 in the direction opposite to the drilling direction D.

Via the drilling tool 1 according to the invention, the maintaining in position of the drilling tool 1 with respect to the tooling 10 and thus with respect to the part P to be drilled is ensured in a reliable manner via the bead 33 protruding radially towards the outside bearing against the distal wall 13 of the tooling 10.

Even in the case of a significant drilling stress, oriented according to said drilling direction D, being applied, the bearing between the bead 33 and the distal wall 13 of the tooling 10 is maintained and the stopping in translation of the drilling tool 1, in the direction opposite to said drilling direction D, is ensured, and in particular contrary to the devices of the prior art providing a stopping in translation of the drilling tool by friction on the inner wall of the guide orifice, for example such as that described in the document EP 0 761 351 B1 or in the document FR 2 912 672 A1.

Throughout the present application, the drilling stress exerted by the drilling tool 1 on the surface SP of the part P to be drilled comprises the stress F exerted by the hollow nose part 2 on the surface SP of the part P to be drilled, as well as the stress exerted by the cutting tool, for example such a drill bit, on said surface SP of the part P to be drilled.

Such a drilling tool 1, having a simple design and a reduced production cost, thus allows to carry out drillings in a part P, and in particular in the aeronautical field, with improved precision, in that the position of the drilling tool 1 during the drilling operation is controlled, and even in the case of a significant drilling stress being applied, which would possibly modify the position of the hollow nose part 2 with respect to the surface SP of the part P to be drilled.

Figure 1:
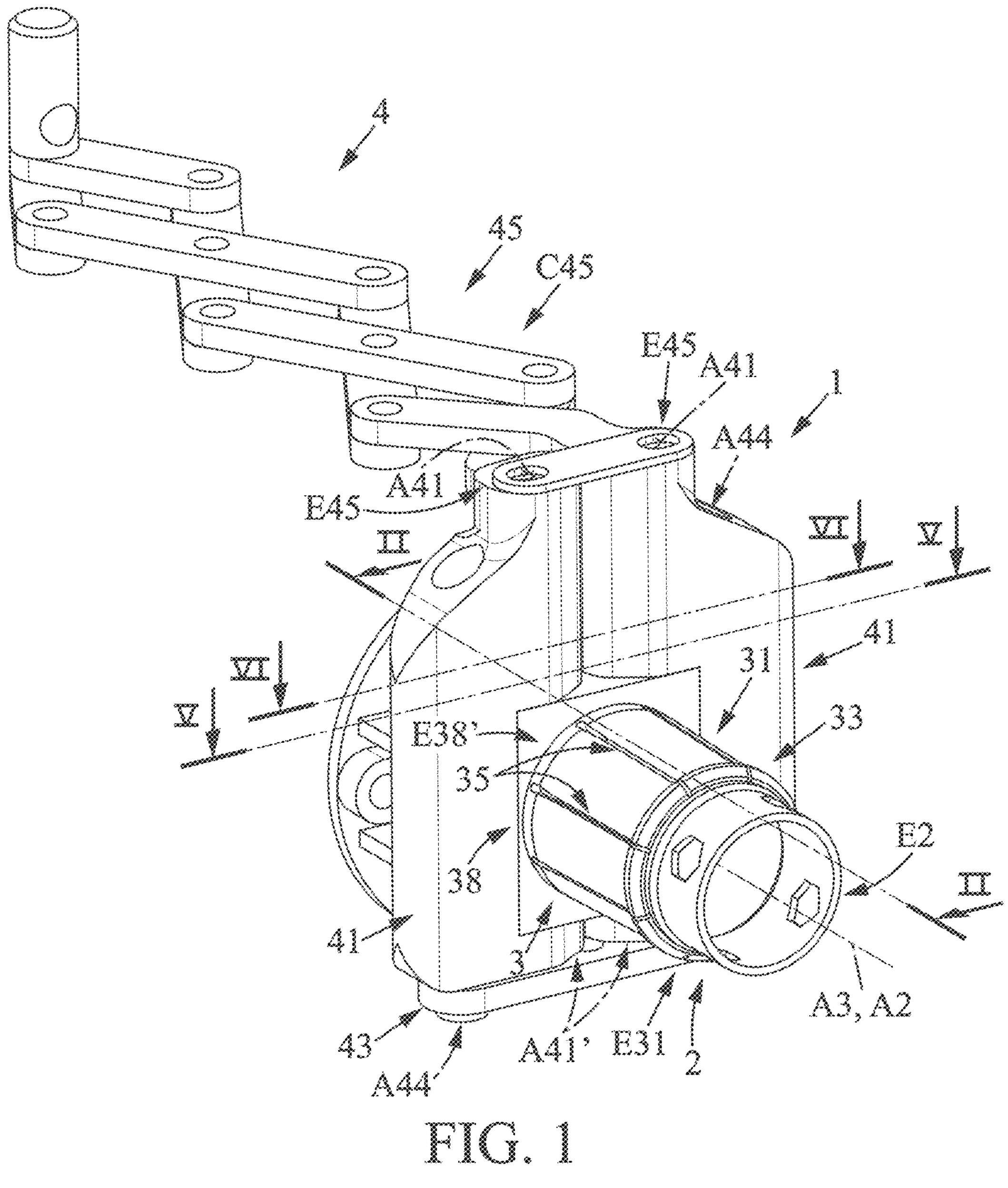
FIG. 1 shows a perspective view of a drilling tool according to an embodiment according to the invention.

As visible more particularly in the embodiment of FIG. 1, the elastic front blocking part 31 has a substantially conical shape, and in order to guarantee it its elasticity to allow the passage of the gripping clamp 3 from the retracted position to the deployed position, and in order to constrain the inner guide surface 32 of the gripping clamp 3 against the outer guide surface 21 of the hollow nose part 2, in the manner of a spring, a plurality of slots 35 can be provided, distributed angularly in a regular manner on the elastic front blocking portion 31 and extending over its entire length.

Advantageously, the outer guide surface 21 of the hollow nose part 2 is configured so as to cause the passage of the gripping clamp 3 from its retracted position towards its deployed position, during the movement of the gripping clamp 3 rearward along the hollow nose part 2 on a first section of length S21 of the outer guide surface 21 of the hollow nose part 2, from the first position of the gripping clamp 3 with respect to the hollow nose part 2, the outer guide surface 21 of the hollow nose part 2 comprising a second section of length S21', adjacent to the first section of length S21, configured to ensure the maintaining of the gripping clamp 3 in the deployed position, without increasing the diameter of the elastic front blocking part 31 by radial expansion, in such a way as to authorise the forward movement of the hollow nose part 2 towards the surface SP of the part P to be drilled to compensate for a relative movement between the guide orifice and the surface of the part to be drilled during the drilling, including the deformation of the surface SP of the part P to be drilled engendered by the drilling stress exerted in particular by the hollow nose part 2 on the surface SP of the part P to be drilled or by the cutting tool, for example such as a drill bit passing through the hollow nose part 2.

It is thus possible to control the stress F exerted by the hollow nose part 2 on the surface SP of the part P to be drilled, and even in the case of a relative movement between the tooling 10 and the surface SP of the part P to be drilled.

Thus, via this advantageous arrangement of the invention, the additional travel of the gripping clamp 3 with respect to the hollow nose part 2, allowed via the second section of length S21', allows to move the hollow nose part 2 with respect to the gripping clamp 3 so as to move it towards the surface SP of the part P to be drilled, in order to increase, or to reduce, the stress exerted by said hollow nose part 2 on the surface SP of the part P to be drilled or simply to compensate for a movement of said hollow nose part 2 with respect to the surface SP of the part P to be drilled, during a drilling operation implemented via the drilling tool 1 according to the invention.

This offers complete control of the position of the hollow nose part 2 with respect to the surface SP of the part P to be drilled, as well as of the stress F applied by said hollow nose part 2 on the surface SP of the part P to be drilled.

Figure 2A:
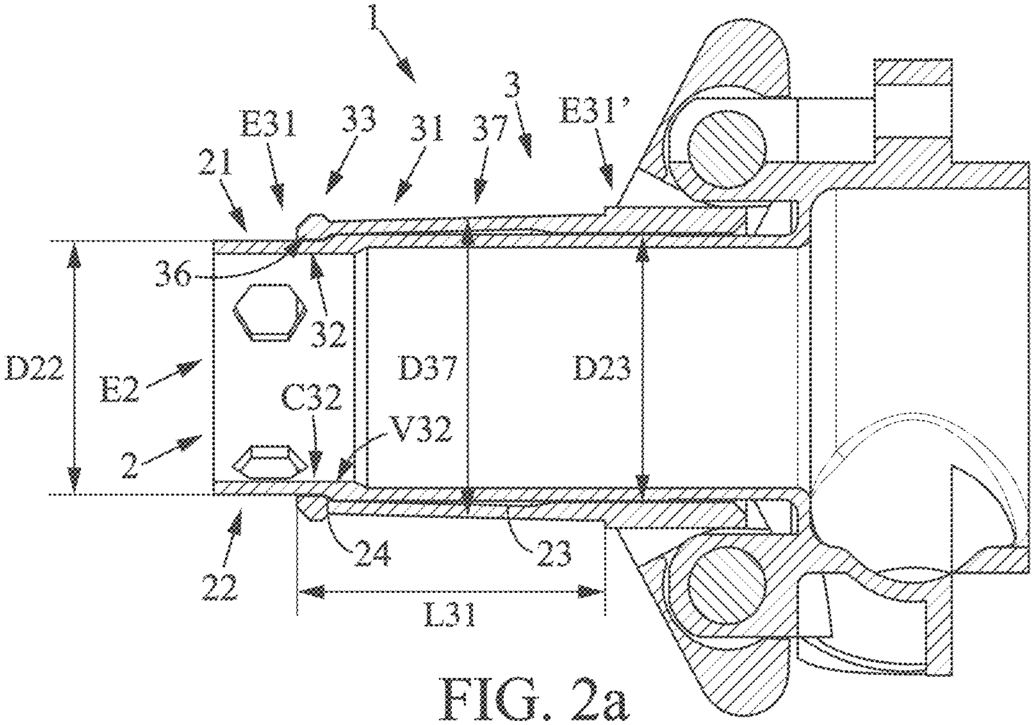
FIG. 2*a* shows a perspective view according to the cutting line II-II of FIG. 1 of the cutting tool of FIG. 1, without the movement mechanism, the gripping clamp being in a first position with respect to the hollow nose part, the gripping clamp being in a retracted position.
Figure 2B:
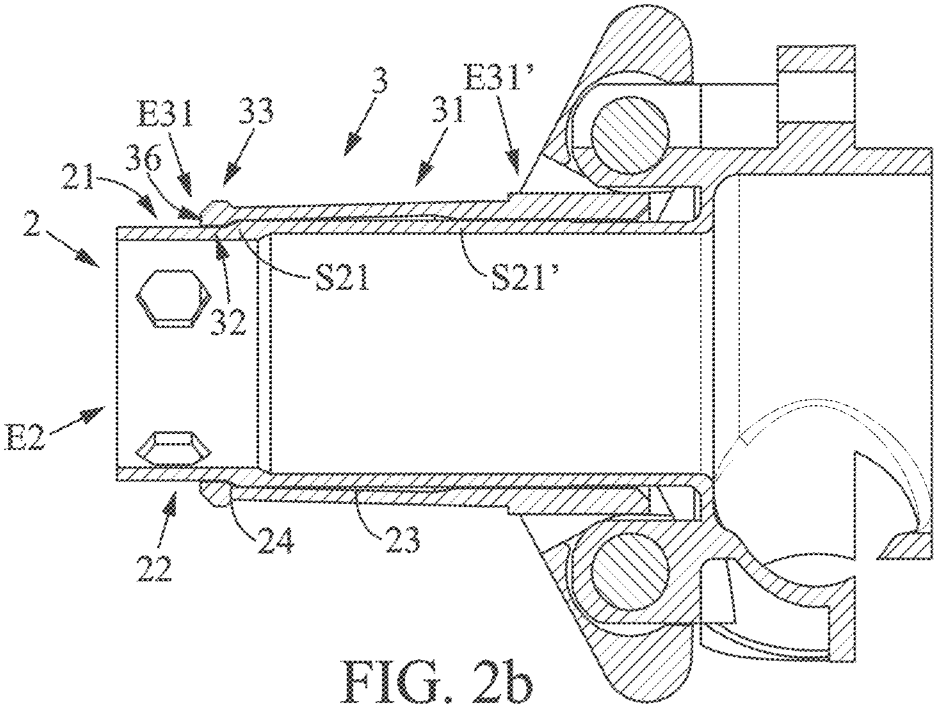
FIG. 2*b* shows a perspective view according to the cutting line II-II of FIG. 1 of the cutting tool of FIG. 1, without the movement mechanism, the gripping clamp being in a second position with respect to the hollow nose part, the gripping clamp being in an intermediate position between its retracted position and its deployed position.
Figure 2C:
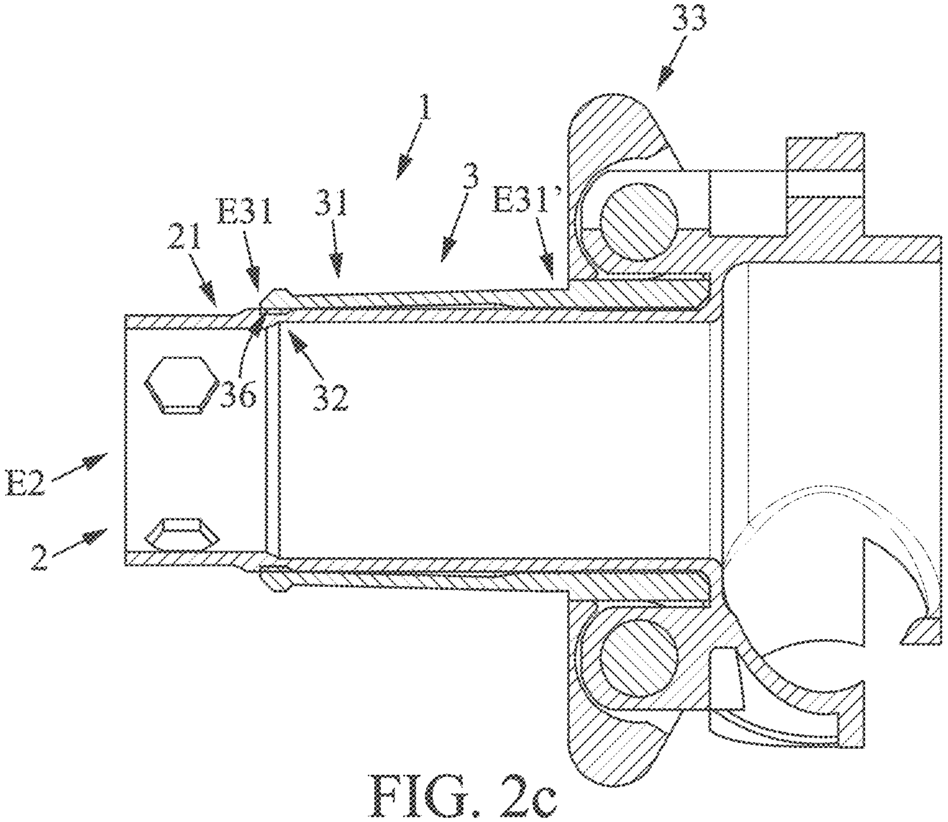
FIG. 2*c* shows a perspective view according to the cutting line II-II of FIG. 1 of the cutting tool of FIG. 1, without the movement mechanism, the gripping clamp being in a third position with respect to the hollow nose part, the gripping clamp being in the deployed position.

As visible in the embodiments of FIGS. 2*c* and 3*c*, by moving the hollow nose part 2 closer to, or away from, the surface SP of the part P to be drilled, it is possible to control the drilling stress applied by said drilling tool 1 on the surface SP of the part to be drilled, and contrary to the drilling tools of the prior art, for example such as that described in the document EP 0 761 351 B1, configured to ensure the immobilisation of the drilling tool with respect to the tooling for a fixed position of the hollow nose part with respect to the gripping clamp, which cannot be modified later, in order to vary the drilling stress applied by said drilling tool or to move the hollow nose part closer to the surface of the part to be drilled, in order possibly to compensate for the deformation of the surface of the part to be drilled.

In the device described in the document FR 2 912 672 A1, said expansion ring does not include such a first section of length nor such a second section of length, and the minuscule movement allowed between the mandrel and the expansion ring with the expansion ring remaining immobilised in the centring orifice cannot allow such a control of the stress exerted by the tool on the part to be drilled, nor the compensation for a relative movement between the mandrel and said part to be drilled.

The second section of length S21' of the guide surface 21 of the hollow nose part can for example be configured to authorise the forward movement of the hollow nose part 2 towards the surface SP of the part P to be drilled, after the passage of the gripping clamp 3 from its retracted position towards its deployed position, according to a travel greater than 0.1 mm, preferably greater than 0.3 mm, and more preferably greater than 0.5 mm. For this purpose, said second section of length S21' can have a length greater than 0.1 mm, preferably greater than 0.3 mm, and more preferably greater than 0.5 mm.

According to one embodiment, the hollow nose part 2 includes a distal end E2, configured to bear against the surface SP of the part P to be drilled in order to exert the desired stress F, the outer guide surface 21 of the hollow nose part 2 including:

- a first guide portion 22 extending from near said distal end E2 of the hollow nose part 2,
- a second guide portion 23, to the rear of said first guide portion 22, forming the second section of length S21',
- a linking portion 24 connecting the first guide portion 22 to the second guide portion 23 while flaring out, forming said first section of length S21.

According to such an embodiment, the elastic front blocking part 31 of the gripping clamp 3 comprises a bead 36 protruding radially towards the inside comprising said inner guide surface 32 bearing against the outer guide surface 21 of the hollow nose part 2, and the outer guide surface 21 of the hollow nose part 2 is configured so that:

- the retracted position of the gripping clamp 3 corresponds to the position of the gripping clamp 3 with respect to the hollow nose part 2 in which the inner guide surface 32 is in contact with the first guide portion 22 of the outer guide surface 21 of the hollow nose part 2,
- the passage from the retracted position towards the deployed position of the gripping clamp 3 corresponds to the position of the gripping clamp 3 with respect to the hollow nose part 2 in which the inner guide surface 32 slides on the totality of the length of the linking portion 24, said inner guide surface 32 cooperating with the second guide portion 23 in such a way as to guarantee the maintaining in the deployed position of the gripping clamp 3, without increasing the diameter of the elastic front blocking part 32 by radial expansion, in such a way as to authorise the forward movement of the hollow nose part 2 towards the surface SP of the part P to be drilled to compensate for a relative movement of the guide orifice of the tooling with respect to the surface of the part to be drilled during the drilling, as well as the deformation of the surface SP of the part P to be drilled engendered by the drilling stress and thus the control of the stress F of the hollow nose part 2 on the surface SP of the part P to be drilled.

As visible in the embodiments of FIGS. 2*a* to 4, the bead 36 protruding radially towards the inside can be positioned facing the bead 33 protruding radially towards the outside, each being positioned on either side of the wall of the elastic front blocking part 31.

The inner guide surface 32 of the elastic front blocking part 31 can advantageously extend over the entire length of the bead 36 protruding radially towards the inside.

Providing a linking portion 24 having a flared shape between said first guide portion 22 and said second guide portion 23 allows to ensure a progressive transition between the retracted position and the deployed position of the gripping clamp 3 and without generating excessive stresses between said inner guide surface 32 and said outer guide surface 21.

According to one embodiment:

- the first guide portion 22 is substantially cylindrical, having a diameter D22,
- the second guide portion 23 is substantially cylindrical having a diameter D23, strictly greater than D22,
- the linking portion 24 is conical.

In a well-known manner, the conicity of a cone corresponds to the value of the angle at the apex of this cone.

Advantageously, and as visible more particularly in the embodiments of FIGS. 2*a* to 2*c* and 3*a* to 3*c*, the length of the second guide portion 23 can be clearly greater than the length of the first guide portion 22, since the first guide portion 22 is not used for the passage of the gripping clamp 3 from its retracted position to its deployed position, but must just be sufficiently long to receive the bead 36 protruding radially towards the inside, when the gripping clamp 3 is in the retracted position.

According to one embodiment, the inner guide surface 32 of the elastic front blocking part 31 includes a cylindrical wall C32, configured to bear against said first guide portion 22 and against said second guide portion 23.

Advantageously, said cylindrical wall C32 of the inner guide surface 32 can correspond to at least a part of the length of the bead 36 protruding radially towards the inside and have a shape complementary to the first guide portion 22 and to the second guide portion 23, in order to facilitate the guiding of the elastic front blocking portion 31 on the outer guide surface of the hollow nose part 2.

According to one embodiment, the inner guide surface 32 includes a wall having a conical shape V32, to the rear of said cylindrical wall C32, having a conicity substantially equal to the conicity of the linking portion 24 of the inner guide surface 21 of the hollow nose part 2.

Such a wall having a conical shape V32 allows to facilitate the sliding of the bead 36 protruding radially towards the inside on the linking portion 24 of the inner guide surface 21 of the hollow nose part 2, in order to ensure a progressive deployment of the gripping clamp 3 from its retracted position towards its deployed position, and without generating excessive stresses between said inner guide surface 32 and said outer guide surface 21.

According to one embodiment, the movement mechanism 4 includes two articulation parts 41 each pivotably articulated onto said rear movement part 38 according to two articulation axes A41, A41' positioned on either side of the longitudinal axis A3 of the gripping clamp 3 and which are the same, the two articulation axes A41, A41' of the first articulation part 41 being parallel and symmetrical to the two articulation axes A41, A41' of the second articulation part 41 with respect to said longitudinal axis A3 of the gripping clamp 3.

Figure 5:
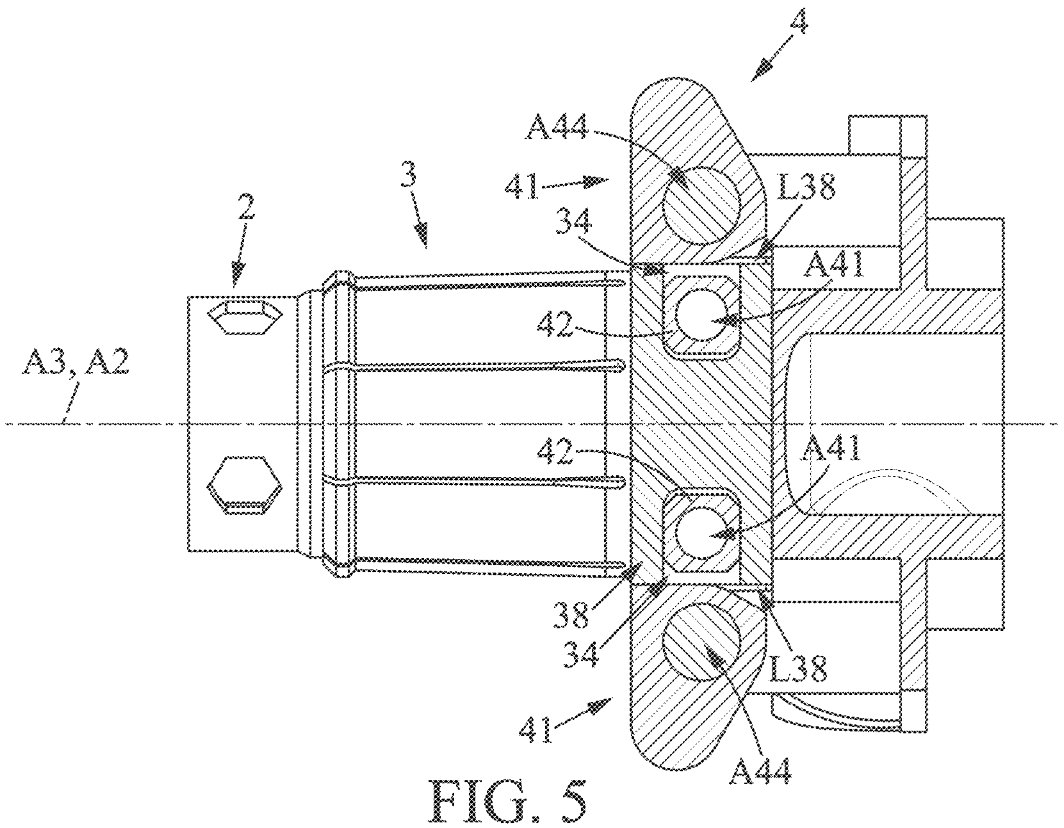
FIG. 5 shows a cross-sectional view, according to the line V-V of FIG. 1, of the drilling tool of FIG. 1.

According to such an embodiment, each articulation axis A41, A41' is received in a bearing 42, as visible in the embodiment of FIG. 5, in particular having a substantially parallelepipedic shape, having a substantially square transverse cross-section, configured to slide in a housing 34 having a corresponding shape made in the rear movement part 38, according to a direction perpendicular to the longitudinal axis of the gripping clamp 3 and to the articulation axis A41, A41' received in said bearing 42.

Said housing 34 can in particular be provided opening onto a lateral wall L38 of the rear movement part 38.

Figure 6:
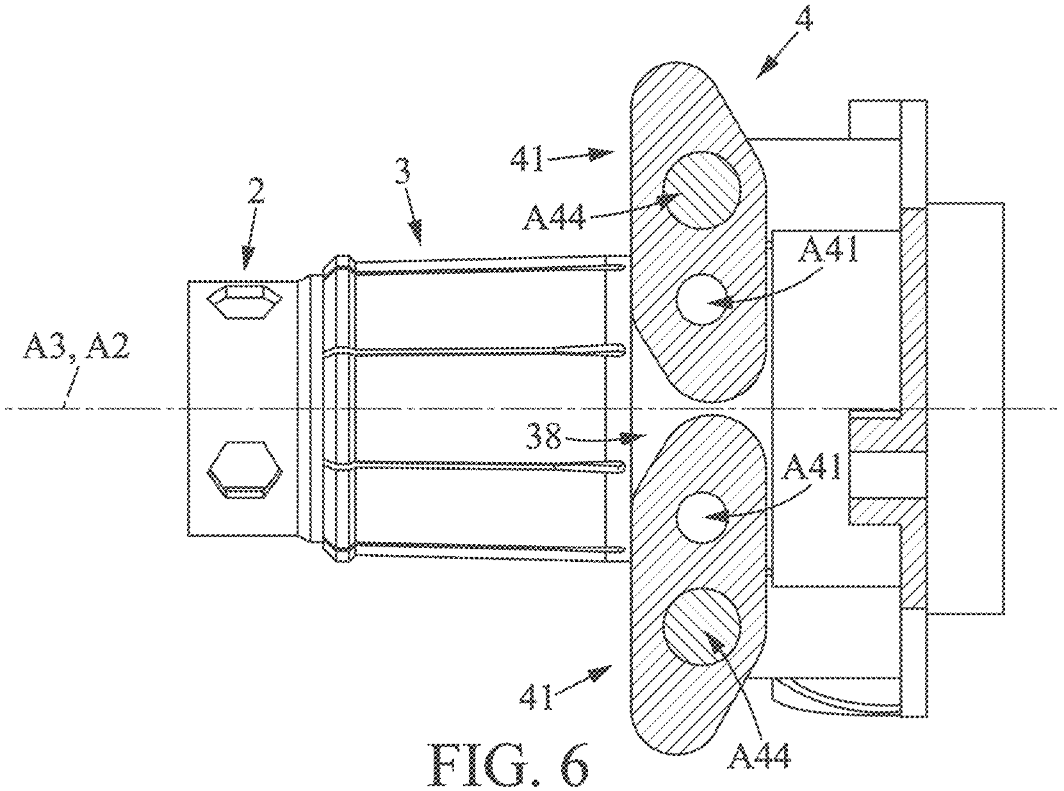
FIG. 6 shows a cross-sectional view, according to the line VI-VI of FIG. 1, of the drilling tool of FIG. 1.

According to such an embodiment, and as visible in the embodiments of FIGS. 1, 5 and 6, each of said articulation parts 41 is pivotably articulated with respect to a fixed plate 43 according to a pivoting axis A44, perpendicular to said longitudinal axis A3 of the gripping clamp 3, the pivoting axes A44 of each of the articulation parts 41 being disposed symmetrically to each other with respect to the longitudinal axis A3 of the gripping clamp 3, and parallel to said articulation axes A41, A41' of the parts 41 for articulation onto the rear movement part 38, the pivoting axis A44 of an articulation part 41 being farther from the longitudinal axis A3 of the gripping clamp 3 than its articulation axes A41, A41'.

According to such an embodiment, said articulation parts 41 are connected to an actuator 45 configured to drive the simultaneous and coordinated counter-rotational pivoting of each of the articulation parts 41 with respect to the fixed plate 43 about each of their pivoting axes A41, A41', so as to drive the rotation of each of said articulation parts 41 with respect to the rear movement part 38 of the gripping clamp 3 about their respective articulation axes A41, A41' and the sliding of each of the bearings 42 in their housing 34, generating a sliding of the gripping clamp 3 with respect to the hollow nose part 2 along the longitudinal axis A3 of the gripping clamp 3.

Thus, such a movement mechanism 4 for the drilling tool 1 allows to exert on the rear movement part 38 a tensile stress distributed in a balanced manner over the four bearings 42 about the longitudinal axis A3, namely a stress having an axis that is substantially the same as the longitudinal axis A3.

It is thus possible to carry out the sliding of the gripping clamp 3 with respect to the hollow nose part 2 according to the longitudinal axis A3 of the gripping clamp 3, and so that said longitudinal axis A3 of the gripping clamp 3 remains the same as the longitudinal axis A2 of the hollow nose part 2, without skewing capable of generating abutting between these two parts during their relative sliding.

As visible in the embodiment of FIG. 1, said actuator 45 can comprise a scissors movement mechanism C45, the two ends E45 of which are each articulated onto an articulation part 41, at their respective articulation axes A41.

The invention also relates to a drilling assembly 100 comprising:

- a drilling tool 1 according to one of the embodiments described above,
- a tooling 10 comprising at least one guide orifice 11 extending between a proximal wall 12 and a distal wall 13, intended to be located near a part P to be drilled.

The guide orifice 11 and the drilling tool 1 are advantageously configured so that in said deployed position of the gripping clamp 3, the bead 33 protruding radially towards the outside of the elastic front blocking part 31 bears against the distal wall 13 of the tooling 10 surrounding said guide orifice 11, preventing the sliding of the gripping clamp 3 and of the drilling tool 1 with respect to the guide orifice 11 in the direction opposite to the drilling direction D.

Such a drilling assembly 100 allows to carry out drillings in a part P, and in particular in the aeronautical field, with improved precision, as explained above with respect to the drilling tool 1 according to the invention, and in that the position of the drilling tool 1 during the drilling operation and the stress F applied by the hollow nose part 2 to the surface SP of the part P to be drilled are completely controlled.

In a well-known manner, a tooling 10 can consist of a plate provided with a proximal wall 12 and a distal wall 13, which is provided to be positioned near the surface SP of a part P to be drilled, and provided with at least one guide orifice 11, receiving inside said drilling tool 1, in order to guide the latter with respect to the part P to be drilled, in order to ensure the suitable positioning of the drilling carried out with said drilling tool 1.

According to one embodiment, the guide orifice 11 has a substantially cylindrical shape having a length L11, having a diameter D11, such that the length L11 is strictly less than the length L31 of the elastic front blocking part 31, and the diameter D11 is strictly less than the diameter D33 of the bead 33 protruding radially towards the outside of the elastic front blocking part 31, when the gripping clamp 3 is in the deployed position.

As visible more particularly in the embodiment of FIG. 3*c*, such a diameter D11 of the guide orifice 11 with respect to the diameter D33 of the bead 33 protruding radially towards the outside of the elastic front blocking part 31 allows to ensure that said bead 33 indeed bears against the distal wall 13 of the tooling 10, when the gripping clamp 3 is in the deployed position, and so as to ensure the stopping in translation of the drilling tool 1 with respect to the tooling 10, and thus with respect to the part P to be drilled, in the direction opposite to said drilling direction D.

The gripping clamp 3 can be configured so that the difference between the diameter D11 of the guide orifice 11 and the diameter D33 of the bead 33 protruding radially towards the outside of the elastic front blocking part 31, when the gripping clamp 3 is in the deployed position, can be greater than 0.1 mm, preferably greater than 0.5 mm, and even more preferably greater than 1 mm.

Likewise, such a length L11 of the guide orifice 11 with respect to the length L31 of the elastic front blocking part 31 allows for it to be possible to make the drilling tool 1 slide, with the gripping clamp 3 in the retracted position, in the guide orifice 11 until the bead 33 protruding radially towards the outside is outside of the guide orifice 11 near the distal wall 13, and for it to still be possible to slide the gripping clamp 3 with respect to the hollow nose part 2 rearward, so as to provoke the radial expansion of the gripping clamp 3 and the passage from the retracted position to the deployed position, or even to guarantee that in said deployed position of the gripping clamp 3 of the drilling tool 1 according to the invention, once the protruding bead 33 bears against the distal wall 13 of the tooling 10, after the travel over said first section of length S21 of the outer guide surface 21 of the hollow nose part 2, said gripping clamp 3 can travel over said second section of length S21' of the hollow nose part 2, in order to continue to move the gripping clamp 3 rearward with respect to the hollow nose part 2, without increasing the diameter of the elastic front blocking part 31, and in order to control the stress F exerted by the hollow nose part 2 on the surface SP of the part P to be drilled, as well as the position of the hollow nose part 2 with respect to the surface SP of the part P to be drilled.

According to one embodiment, the elastic front blocking part 31 of the gripping clamp 3 of the drilling tool 1 has an outer guide surface 37 extending to the rear of the bead 33 protruding radially towards the outside, the diameter D37 of which is between a minimum value D37min, in said retracted position, and a maximum value D37max, in said deployed position, such that the maximum value D37max of the diameter D37 of the outer guide surface 37 is strictly less than the diameter D11 of the guide orifice 11.

Via this advantageous arrangement of the invention, it is ensured that the elastic front blocking part 31 remains capable of sliding with respect to the guide orifice 11, whether the gripping clamp 3 is in the retracted position or in the deployed position.

As visible more particularly in the embodiment of FIG. 2*a*, in the case in which said outer guide surface 37 of the elastic front blocking part 31 has a substantially conical shape, at least in the deployed position of the gripping clamp 3, as described above, the diameter D37 of said guide surface 37 is variable over the length of said elastic front blocking part 31, but nevertheless always less than said maximum value D37max.

The invention also relates to a method for drilling a part P implementing a drilling assembly 100 according to one of the embodiments described above, with a drilling tool 1, wherein the outer guide surface 21 of the hollow nose part 2 is configured so as to cause the passage of the gripping clamp 3 from its retracted position towards its deployed position, during the movement of the gripping clamp 3 rearward along the hollow nose part 2 over a first section of length S21 of the outer guide surface 21 of the hollow nose part 2, from the first position of the gripping clamp 3 with respect to the hollow nose part 2, the outer guide surface 21 of the hollow nose part 2 comprising a second section of length S21', adjacent to the first section of length S21, configured to ensure the maintaining of the gripping clamp 3 in the deployed position, without increasing the diameter of the elastic front blocking part 31 by radial expansion, in such a way as to authorise the forward movement of the hollow nose part 2 towards the surface SP of the part P to be drilled and thus to control the stress F exerted by the hollow nose part 2 on the surface SP of the part P to be drilled.

Said drilling method comprises the following steps:

- inserting the gripping clamp 3 of the drilling tool 1, in its retracted position, into the guide orifice 11 of the tooling 10, from its mouth 14 on the proximal wall 12 of the tooling 10, until the bead 33 protruding radially towards the outside of the elastic front blocking part 31 entirely exits the guide orifice 11 at its mouth 15 on the distal wall of the tooling,
- moving the gripping clamp 3 rearward along the hollow nose part 2 on the first section of length S21 of the outer guide surface of the hollow nose part 2, until the deployed position of the gripping clamp 3, generating the stopping of the sliding of the drilling tool 1 with respect to the guide orifice 11 in the direction opposite to the drilling direction D, the bead 33 protruding radially towards the outside of the elastic front blocking part 31 bearing on the distal wall 13 of the tooling 10,
- applying of a controlled stress F by the hollow nose part 2 onto the surface SP of the part P to be drilled, by movement of the gripping clamp 3 by an adjustment travel on the second section of length S21' of the outer guide surface 21 of the hollow nose part 2, without increasing the diameter of the elastic front blocking part 31, to compensate for a relative movement between the guide orifice 11 of the tooling 10 and the surface SP of the part P to be drilled during the drilling, as well as the deformation of the surface SP of the part P to be drilled engendered by the drilling stress.

The steps of the method according to the invention are illustrated in a schematic manner in the embodiments of FIGS. 3*a* to 3*c*.

Such a method allows to obtain a drilling with improved precision of said part P to be drilled, in that the position of the drilling tool with respect to the tooling 10, and thus with respect to the surface SP of the part P to be drilled, as well as the drilling stress, can be controlled.

Naturally, other embodiments could have been imagined by a person skilled in the art without going beyond the context of the invention defined by the claims below.

LIST OF THE REFERENCE SIGNS

1. Drilling tool
2. Hollow nose part
A2. Longitudinal axis
E2. Distal end
21. Outer guide surface
S21. First section of length
S21'. Second section of length
22. First guide portion
23. Second guide portion
24. Linking portion
3. Gripping clamp
A3. Longitudinal axis
31. Elastic front blocking part
E31. Distal end
E31'. Proximal end
L31. Length
32. Inner guide surface
C32. Cylindrical wall
V32. Wall having a conical shape 33. Bead
D33. Diameter
34. Housing
35. Slots
36. Bead
37. Outer guide surface
D37. Diameter
38. Rear movement part
4. Movement mechanism
41. Articulation part
A41, A41'. Articulation axis
42. Bearing
43. Fixed plate
A44. Pivoting axis
45. Actuator
C45. Scissors movement mechanism
E45. End
10. Tooling
11. Guide orifice
D11. Diameter
L11. Length
12. Proximal wall
13. Distal wall
14, 15. Mouth
100. Drilling assembly
D. Drilling direction
F. Stress

The invention claimed is:

1. A drilling tool configured to cooperate with a tooling including a guide orifice extending between a first wall of the tooling and a second wall of the tooling, the second wall being closer to a part to be drilled than the first wall, the drilling tool comprising:

a hollow nose part having an outer guide surface, the hollow nose part being configured to allow a drill bit to pass therethrough in a drilling direction from the first wall to the second wall of the tooling; and a clamp including an elastic front part slidingly mounted on the outer guide surface of the hollow nose part via an inner guide surface, the elastic front part having a first end and an opposing second end, said elastic front part being rigidly connected to a rear movement part, a mechanism being connected to the rear movement part in order to move the clamp rearward along the hollow nose part in such a way that the elastic front part is expanded radially outward in an elastic manner, wherein the first end of the elastic front part comprises an outside bead protruding radially outward, configured to prevent translation of the drilling tool with respect to the tooling by bearing against the second wall of the tooling surrounding said guide orifice, wherein the clamp is configured to move, relative to the hollow nose part, from a retracted position to a deployed position, wherein the clamp is configured to be inserted through the guide orifice in the retracted position, wherein, in the deployed position, the elastic front part, including the outside bead protruding radially outward, is expanded radially, and the outside bead is configured such that, in the deployed position, the outside bead is expanded radially such that an outer extent of the bead is larger than said guide orifice, thereby allowing the outside bead to bear against the second wall of the tooling surrounding the guide orifice, preventing the sliding of the clamp and of the drilling tool with respect to the guide orifice in a direction opposite to the drilling direction, wherein during movement of the clamp rearward, in the direction opposite to the drilling direction, along the hollow nose part on a first section of length of the outer guide surface of the hollow nose part, the outer guide surface of the hollow nose part is configured so as to cause the clamp to transition from the retracted position of the clamp to the deployed position of the clamp, wherein the outer guide surface of the hollow nose part further comprises a second section of length, adjacent to the first section of length, configured to maintain the clamp in the deployed position, without increasing the diameter of the elastic front part by radial expansion, in such a way as to allow forward, in the drilling direction, movement of the hollow nose part towards a surface of the part to be drilled, wherein the hollow nose part includes an end surface, which is configured to bear against the surface of the part to be drilled in order to exert a desired stress, the outer guide surface of the hollow nose part including:

a first guide surface extending from the end surface of the hollow nose part to an intermediate surface, a second guide surface, rearward, in the direction opposite to the drilling direction, of said first guide surface, the second guide surface defining the second section of length, and the intermediate surface having a flared shape connecting the first guide surface to the second guide surface, the intermediate surface defining said first section of length, wherein the elastic front part of the clamp comprises an inner bead protruding radially inward comprising said inner guide surface bearing against the outer guide surface of the hollow nose part, wherein the outer guide surface of the hollow nose part is configured so that:

the retracted position of the clamp corresponds to the position of the clamp with respect to the hollow nose part in which the inner guide surface is in contact with the first guide surface of the outer guide surface of the hollow nose part, and a passage from the retracted position to the deployed position of the clamp corresponds to a position of the clamp with respect to the hollow nose part in which the inner guide surface slides on the first section of length of the intermediate surface, said inner guide surface cooperating with the second guide surface in such a way as to guarantee the maintaining in the deployed position of the clamp, without increasing the diameter of the elastic front part by radial expansion, to allow forward movement of the hollow nose part towards the surface of the part to be drilled to compensate for a relative movement between the guide orifice of the tooling and the surface of the part to be drilled during the drilling, and to compensate for deformation of the surface of the part to be drilled, and thus allow control of the stress exerted by the hollow nose part on the surface of the part to be drilled.

2. The drilling tool according to claim 1, wherein:

the first guide surface is cylindrical, having a first diameter, the second guide surface is cylindrical having a second diameter greater than the first diameter, the intermediate surface is conical.

3. The drilling tool according to claim 2, wherein the inner guide surface of the elastic front part includes a cylindrical wall configured to bear against said first guide surface in the retracted position of the clamp and against said second guide surface in the deployed position of the clamp.

4. The drilling tool according to claim 3, wherein the inner guide surface includes a conical wall rearward, in the direction opposite to the drilling direction, of said cylindrical wall, the conical wall having a conicity substantially equal to the conicity of the intermediate surface of the hollow nose part.

5. The drilling tool according to claim 1, wherein the mechanism includes a first articulation part and a second articulation part, each of the first articulation part and the second articulation part being pivotably articulated onto said rear movement part according to two articulation axes respectively positioned on either side of a longitudinal axis of the clamp, the two articulation axes of the first articulation part being parallel and symmetrical to the two articulation axes of the second articulation part with respect to said longitudinal axis of the clamp, wherein each articulation axis is defined by a bearing configured to slide, in a direction perpendicular to the longitudinal axis of the clamp, in a respective housing having a shape corresponding to an opening in the rear movement part, wherein each of said first and second articulation parts is pivotably articulated with respect to a fixed plate according to a respective pivoting axis, perpendicular to said longitudinal axis of the clamp, the respective pivoting axes of each of the articulation parts being disposed symmetrically to each other with respect to the longitudinal axis of the clamp, and parallel to said articulation axes of the first and second articulation parts for articulation about the rear movement part, the pivoting axis of each of the first and second articulation parts being farther from the longitudinal axis of the clamp than the articulation axes, and wherein said first and second articulation parts are connected to an actuator configured to drive simultaneous rotational pivoting of each of the first and second articulation parts with respect to the fixed plate about each of their respective pivoting axes in opposite directions, to drive the rotation of each of said articulation parts with respect to the rear movement part of the clamp about their respective articulation axes and the sliding of each of the bearings in their respective housing, generating a sliding of the clamp with respect to the hollow nose part along the longitudinal axis of the clamp.

6. The drilling tool according to claim 2, wherein the mechanism includes a first articulation part and a second articulation part, each of the first articulation part and the second articulation part being pivotably articulated onto said rear movement part according to two articulation axes respectively positioned on either side of a longitudinal axis of the clamp, the two articulation axes of the first articulation part being parallel and symmetrical to the two articulation axes of the second articulation part with respect to said longitudinal axis of the clamp, wherein each articulation axis is defined by a bearing configured to slide, in a direction perpendicular to the longitudinal axis of the clamp, in a respective housing having a shape corresponding to an opening in the rear movement part, wherein each of said first and second articulation parts is pivotably articulated with respect to a fixed plate according to a respective pivoting axis, perpendicular to said longitudinal axis of the clamp, the respective pivoting axes of each of the articulation parts being disposed symmetrically to each other with respect to the longitudinal axis of the clamp, and parallel to said articulation axes of the first and second articulation parts for articulation about the rear movement part, the pivoting axis of each of the first and second articulation parts being farther from the longitudinal axis of the clamp than the articulation axes, and wherein said first and second articulation parts are connected to an actuator configured to drive simultaneous rotational pivoting of each of the first and second articulation parts with respect to the fixed plate about each of their respective pivoting axes in opposite directions, to drive the rotation of each of said articulation parts with respect to the rear movement part of the clamp about their respective articulation axes and the sliding of each of the bearings in their respective housing, generating a sliding of the clamp with respect to the hollow nose part along the longitudinal axis of the clamp.

7. The drilling tool according to claim 3, wherein the mechanism includes a first articulation part and a second articulation part, each of the first articulation part and the second articulation part being pivotably articulated onto said rear movement part according to two articulation axes respectively positioned on either side of a longitudinal axis of the clamp, the two articulation axes of the first articulation part being parallel and symmetrical to the two articulation axes of the second articulation part with respect to said longitudinal axis of the clamp, wherein each articulation axis is defined by a bearing configured to slide, in a direction perpendicular to the longitudinal axis of the clamp, in a respective housing having a shape corresponding to an opening in the rear movement part, wherein each of said first and second articulation parts is pivotably articulated with respect to a fixed plate according to a respective pivoting axis, perpendicular to said longitudinal axis of the clamp, the respective pivoting axes of each of the articulation parts being disposed symmetrically to each other with respect to the longitudinal axis of the clamp, and parallel to said articulation axes of the first and second articulation parts for articulation about the rear movement part, the pivoting axis of each of the first and second articulation parts being farther from the longitudinal axis of the clamp than the articulation axes, and wherein said first and second articulation parts are connected to an actuator configured to drive simultaneous rotational pivoting of each of the first and second articulation parts with respect to the fixed plate about each of their respective pivoting axes in opposite directions, to drive the rotation of each of said articulation parts with respect to the rear movement part of the clamp about their respective articulation axes and the sliding of each of the bearings in their respective housing, generating a sliding of the clamp with respect to the hollow nose part along the longitudinal axis of the clamp.

8. The drilling tool according to claim 4, wherein the mechanism includes a first articulation part and a second articulation part, each of the first articulation part and the second articulation part being pivotably articulated onto said rear movement part according to two articulation axes respectively positioned on either side of a longitudinal axis of the clamp, the two articulation axes of the first articulation part being parallel and symmetrical to the two articulation axes of the second articulation part with respect to said longitudinal axis of the clamp, wherein each articulation axis is defined by a bearing configured to slide, in a direction perpendicular to the longitudinal axis of the clamp, in a respective housing having a shape corresponding to an opening in the rear movement part, wherein each of said first and second articulation parts is pivotably articulated with respect to a fixed plate according to a respective pivoting axis, perpendicular to said longitudinal axis of the clamp, the respective pivoting axes of each of the articulation parts being disposed symmetrically to each other with respect to the longitudinal axis of the clamp, and parallel to said articulation axes of the first and second articulation parts for articulation about the rear movement part, the pivoting axis of each of the first and second articulation parts being farther from the longitudinal axis of the clamp than the articulation axes, and wherein said first and second articulation parts are connected to an actuator configured to drive simultaneous rotational pivoting of each of the first and second articulation parts with respect to the fixed plate about each of their respective pivoting axes in opposite directions, to drive the rotation of each of said articulation parts with respect to the rear movement part of the clamp about their respective articulation axes and the sliding of each of the bearings in their respective housing, generating a sliding of the clamp with respect to the hollow nose part along the longitudinal axis of the clamp.

* * * * *